United States Patent
Kamiya

(10) Patent No.: US 10,823,935 B2
(45) Date of Patent: Nov. 3, 2020

(54) IMAGING DEVICE

(71) Applicant: FUJIFILM Corporation, Tokyo (JP)

(72) Inventor: Takeshi Kamiya, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 148 days.

(21) Appl. No.: 16/122,674

(22) Filed: Sep. 5, 2018

(65) Prior Publication Data
US 2019/0004284 A1 Jan. 3, 2019

Related U.S. Application Data

(63) Continuation of application No. PCT/JP2017/008745, filed on Mar. 6, 2017.

(30) Foreign Application Priority Data

Mar. 11, 2016 (JP) ................................. 2016-048072

(51) Int. Cl.
G02B 7/36 (2006.01)
G03B 7/22 (2006.01)
(Continued)

(52) U.S. Cl.
CPC ................. G02B 7/36 (2013.01); B60R 1/00 (2013.01); G03B 3/00 (2013.01); G03B 7/22 (2013.01);
(Continued)

(58) Field of Classification Search
CPC .. H04N 5/2253; H04N 5/2254; H04N 5/2258; H04N 5/23212; G02B 7/36; G03B 3/00; G03B 7/22; G06T 5/003; B60R 1/00
See application file for complete search history.

(56) References Cited

U.S. PATENT DOCUMENTS 5,892,855 A * 4/1999 Kakinami ............ G06K 9/4633
348/119
6,115,552 A 9/2000 Kaneda
(Continued)

FOREIGN PATENT DOCUMENTS

CN 101682690 A 3/2010
JP H11-006951 A 1/1999
(Continued)

OTHER PUBLICATIONS

An Office Action mailed by the Japanese Patent Office dated Sep. 10, 2019, which corresponds to Japanese Patent Application No. 2018-504473 and is related to U.S. Appl. No. 16/122,674.
(Continued)

*Primary Examiner* — Leon Flores
(74) *Attorney, Agent, or Firm* — Studebaker & Brackett PC

(57) ABSTRACT

The imaging device includes: an imaging section that includes a plurality of lens units having optical axes aligned in the same direction and one or more imaging elements, the lens units and the imaging elements being combined to form imaging units, the imaging units having different focus temperatures; an image processing unit that calculates a sharpness of an image acquired by each imaging unit; a selection unit that selects an imaging unit which acquires a use image on the basis of the sharpness; and a control unit that controls the imaging section, the image processing unit, and the selection unit.

10 Claims, 8 Drawing Sheets

(51) Int. Cl.
*G03B 3/00* (2006.01)
*B60R 1/00* (2006.01)
*H04N 5/225* (2006.01)
*G06T 5/00* (2006.01)
*H04N 5/232* (2006.01)
*G03B 37/04* (2006.01)

(52) U.S. Cl.
CPC ............ *G06T 5/003* (2013.01); *H04N 5/2253* (2013.01); *H04N 5/2254* (2013.01); *H04N 5/2258* (2013.01); *H04N 5/23212* (2013.01); *G03B 37/04* (2013.01); *G06T 2207/20172* (2013.01)

(56) References Cited

U.S. PATENT DOCUMENTS

| | | |
|---|---|---|
| 2003/0086013 A1 | 5/2003 | Kratani |
| 2006/0171696 A1 | 8/2006 | Murata et al. |
| 2010/0053414 A1 | 3/2010 | Tamaki et al. |
| 2012/0019905 A1 | 1/2012 | Teraoka et al. |
| 2012/0176528 A1* | 7/2012 | Denny .................... G03B 3/00 348/345 |
| 2014/0043701 A1 | 2/2014 | Motomura |
| 2014/0055572 A1* | 2/2014 | Shirai .................. H04N 5/2258 348/47 |
| 2015/0168801 A1 | 6/2015 | Yamada et al. |

FOREIGN PATENT DOCUMENTS

| | | |
|---|---|---|
| JP | 2003-143459 A | 5/2003 |
| JP | 2004-325603 A | 11/2004 |
| JP | 2005-109622 A | 4/2005 |
| JP | 2005-348319 A | 12/2005 |
| JP | 2006-217131 A | 8/2006 |
| JP | 2007-158825 A | 6/2007 |
| JP | 2010-276752 A | 12/2010 |
| JP | 2014-026262 A | 2/2014 |
| JP | 2016-004152 A | 1/2016 |
| WO | 2010/061604 A1 | 6/2010 |
| WO | 2012/147278 A1 | 11/2012 |

OTHER PUBLICATIONS

International Search Report issued in PCT/JP2017/008745; dated Jun. 27, 2017.

Written Opinion issued in PCT/JP2017/008745; dated Jun. 27, 2017.

International Preliminary Report on Patentability issued in PCT/JP2017/008745; dated Jul. 4, 2018.

An Office Action mailed by the State Intellectual Property Office of the People's Republic of China dated Apr. 20, 2020, which corresponds to Chinese Patent Application No. 201780016072.7 and is related to U.S. Appl. No. 16/122,674.

* cited by examiner

IMAGING DEVICE

CROSS-REFERENCE TO RELATED APPLICATIONS

This application is a continuation application of International Application No. PCT/JP2017/008745, filed Mar. 6, 2017, the disclosure of which is incorporated herein by reference in its entirety. Further, this application claims priority from Japanese Patent Application No. 2016-048072, filed Mar. 11, 2016, the disclosure of which is incorporated herein by reference in its entirety.

BACKGROUND OF THE INVENTION

1. Field of the Invention

The present invention relates to an imaging device suitable for a sensing camera that is provided in a moving body, such as a car, or a surveillance camera that is used outdoors.

2. Description of the Related Art

In recent years, a technique has been proposed in which a camera is provided in a vehicle and captures a view in front of the vehicle, the lanes are recognized on the basis of the captured image or, for example, a vehicle, a pedestrian, and/or an obstacle is recognized on the basis of the captured image, and the information is used for vehicle movement control such as the autonomous driving, automatic braking, and/or lane keeping assist control of the vehicle. For example, the imaging devices disclosed in JP2010-276752A, WO2010/061604A, and JP2004-325603A have been known as the in-vehicle cameras.

SUMMARY OF THE INVENTION

A lens provided in the in-vehicle camera is used in a wide environmental temperature range. For example, the lower limit of the environmental temperature range is from about −60° C. to about −40° C. and the upper limit thereof is from about 80° C. to about 105° C. Therefore, the amount of defocusing of the lens caused by a change in temperature is very large. As a result, the sharpness of the image is significantly reduced.

For a lens for a digital camera, the amount of defocusing is reduced by analyzing image data obtained by an imaging element and moving the lens in the optical axis direction to adjust the focus such that sharpness increases.

However, in a case in which the same solution as described above is applied to the lens provided in the in-vehicle camera, grease for a cam and/or a gear for moving the lens is hardened at a low temperature and flows out at a high temperature due to the expansion of the environmental temperature range in which the lens is used. In this case, there is a concern that the cam and/or the gear will be fixed. In addition, there is a concern that the cam and/or the gear will be worn out due to the vibration of the vehicle and a large amount of rattling will occur. As a result, it is difficult to appropriately move the lens and to obtain an image with high sharpness.

For this reason, for the lens used in the in-vehicle camera, preferably, the problem is not solved by moving the lens to correct the amount of defocusing, but by suppressing the amount of defocusing at the beginning. JP2010-276752A discloses a method which appropriately selects a lens material and the power of a lens to suppress the amount of defocusing. WO2010/061604A discloses a method which offsets the amount of defocusing with the thermal expansion of a lens and the thermal expansion of a spacer. JP2004-325603A discloses a method which provides heat generation means for maintaining the temperature of a lens in a constant range.

However, in the method disclosed in JP2010-276752A, there are a small number of options for the lens material and a main solution is to select the power of the lens, considering the following: the ensuring of reliability over a long period of 5 years to 10 years required for the lens used in the in-vehicle camera; a reduction in the size of a pixel with an increase in the number of pixels in the future; a resonance to a higher temperature (for example, 125° C. or more); and/or image formation in a wide wavelength range from visible light to a near infrared region (the longest wavelength of about 1000 nm). Therefore, flexibility in the design is reduced. As a result, for example, it is difficult to obtain a high-performance lens that responds to a wide wavelength range and reduces aberration. In the method disclosed in WO2010/061604A, it is difficult to maintain the amount of expansion and contraction caused by the thermal expansion of a member at a constant value over a long period of time and the possibility that the reliability of the device will be reduced is high. In the method disclosed in JP2004-325603A, a heater deteriorates due to long-term use and the possibility that the reliability of the device will be reduced is high.

The defocusing problem of the imaging device used in a wide temperature range is not limited to the in-vehicle camera and also occurs in the imaging devices which are assumed to be used in a severe environment, such as surveillance cameras and/or aerospace cameras.

The invention has been made in view of the above-mentioned problems and an object of the invention is to provide an imaging device that can stably acquire a high-quality image in a wide temperature range over a long period of time.

An imaging device according to the invention comprises: an imaging section that includes a plurality of lens units having optical axes aligned in the same direction and one or more imaging elements, the lens units and the imaging elements being combined to form imaging units, the imaging units having different focus temperatures; an image processing unit that calculates a sharpness of an image acquired by each imaging unit; a selection unit that selects an imaging unit which acquires a use image on the basis of the sharpness; and a control unit that controls the imaging section, the image processing unit, and the selection unit.

Here, the term "the plurality of lens units having the optical axes aligned in the same direction" means that the plurality of lens units are arranged in a state in which the imaging units obtained by combining each lens unit and the imaging element can capture images substantially in the same direction, is not limited to an aspect in which the directions of the optical axes of each lens unit are completely aligned with each other, and means that, in a case in which the optical axis of one lens unit is a reference optical axis, the inclination of the optical axes of the other lens units with respect to the reference optical axis is in the range of ±10°.

In the imaging device according to the invention, the control unit may direct the image processing unit to calculate the sharpness of the image acquired by the imaging unit which is acquiring the use image. In a case in which the sharpness of the use image is less than a set threshold value, the control unit may direct the imaging section to capture images using the plurality of imaging units, may direct the image processing unit to calculate the sharpness of the image acquired by each imaging unit, and may direct the selection unit to reselect the imaging unit which acquires the use image.

The control unit may direct the imaging section to capture images using the plurality of imaging units, may direct the image processing unit to calculate the sharpness of the image acquired by each imaging unit, and may direct the selection unit to reselect the imaging unit which acquires the use image at a set time interval.

In the above-mentioned configuration in which the control unit directs the selection unit to reselect the imaging unit which acquires the use image, in a case in which the imaging unit which acquires the use image is reselected, the control unit may direct the imaging sections to capture images using the imaging unit which is acquiring the use image, an imaging unit with a focus temperature that is closest to the focus temperature of the imaging unit which is acquiring the use image in a range that is higher than the focus temperature of the imaging unit which is acquiring the use image, and an imaging unit with a focus temperature that is closest to the focus temperature of the imaging unit which is acquiring the use image in a range that is lower than the focus temperature of the imaging unit which is acquiring the use image and may direct the image processing unit to calculate the sharpnesses of only the images acquired by the imaging unit which is acquiring the use image, the imaging unit with the focus temperature that is closest to the focus temperature of the imaging unit which is acquiring the use image in the range that is higher than the focus temperature of the imaging unit which is acquiring the use image, and the imaging unit with the focus temperature that is closest to the focus temperature of the imaging unit which is acquiring the use image in the range that is lower than the focus temperature of the imaging unit which is acquiring the use image.

The selection unit may select an imaging unit which has acquired the image with the highest sharpness as the imaging unit which acquires the use image.

The imaging section may be configured such that distances from rearmost ends of lenses in the lens units to the imaging elements on the optical axis are different from each other.

Two or more of the plurality of lens units may have the same lens configuration.

Two or more of the plurality of lens units may have different lens configurations.

Leading ends of the lenses in the plurality of lens units may be in the same plane perpendicular to the optical axis.

The imaging section may be configured such that an individual imaging element is combined with each lens unit.

The imaging section may be configured such that the plurality of lens units share one imaging element.

The imaging device according to the invention includes a plurality of imaging units with different focus temperatures, calculates the sharpness of the image acquired by each imaging unit, and selects the imaging unit suitable for acquiring the use image on the basis of the calculated sharpness. Therefore, it is possible to acquire an image with high sharpness in a wide temperature range, without providing a mechanical focus adjustment mechanism. As a result, it is possible to achieve an imaging device that can stably acquire a high-quality image in a wide temperature range over a long period of time.

DESCRIPTION OF THE PREFERRED EMBODIMENTS

Figure 1:
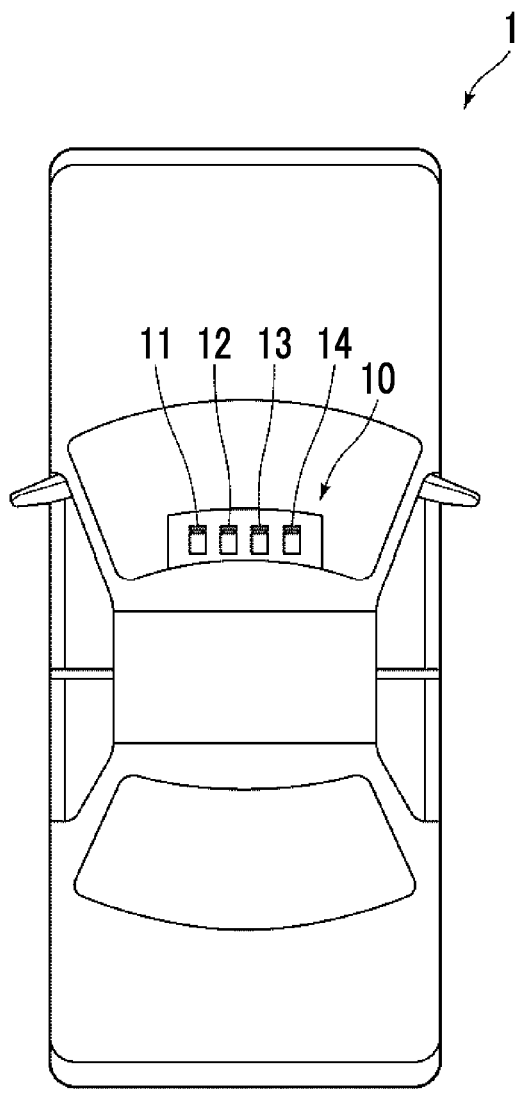
FIG. 1 is a diagram illustrating the configuration of a car provided with an imaging device according to a first embodiment of the invention.

Hereinafter, a first embodiment of the invention will be described in detail with reference to the drawings. FIG. 1 is a diagram illustrating the configuration of a car provided with an imaging device according to the first embodiment of the invention and FIG. 2 is a block diagram illustrating the imaging device illustrated in FIG. 1.

Figure 2:
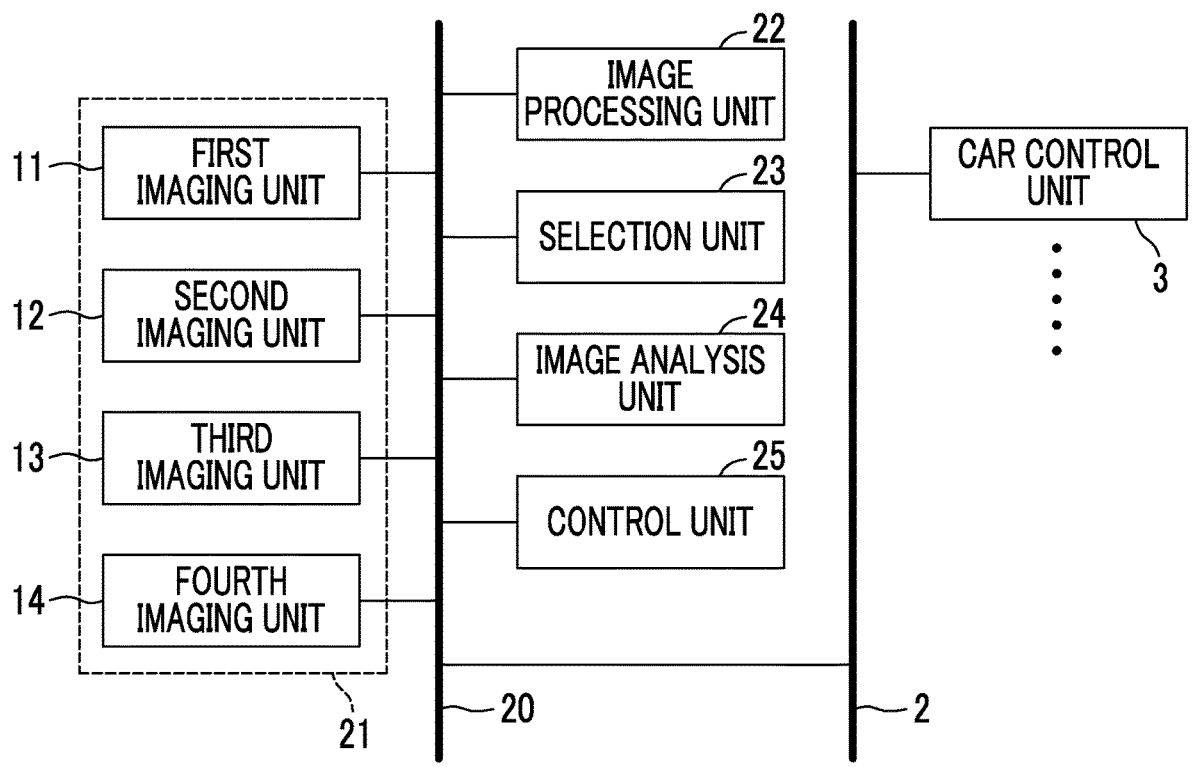
FIG. 2 is a block diagram illustrating the imaging device illustrated in FIG. 1.

As illustrated in FIGS. 1 and 2, an imaging device 10 according to this embodiment is attached to the inside of a windshield of a car 1 and includes an imaging section 21 that includes first to fourth imaging units 11 to 14 having different focus temperatures, an image processing unit 22 that calculates the sharpness of an image acquired by each imaging unit, a selection unit 23 that selects an imaging unit acquiring a use image on the basis of the sharpness, an image analysis unit 24 that recognizes lanes included in the use image or recognizes a vehicle, a pedestrian, and/or an obstacle, and a control unit 25 that controls the imaging section 21, the image processing unit 22, the selection unit 23, and the image analysis unit 24.

The imaging section 21, the image processing unit 22, the selection unit 23, the image analysis unit 24, and the control unit 25 are connected to a signal bus 20 in the imaging device 10 and are configured such that they can exchange signals therebetween.

The signal bus 20 in the imaging device 10 is connected to a signal bus 2 in the car 1 and is configured such that the analysis result of the image analysis unit 24 can be transmitted from the imaging device 10 to a car control unit 3 in the car 1. With this configuration, the car 1 can perform vehicle movement control, such as the autonomous driving, automatic braking, and/or lane keeping assist control of the car 1, on the basis of the analysis result of the image analysis unit 24. For example, a controller area network (CAN) can be used as the signal bus 2 in the car 1 and the signal bus 20 in the imaging device 10. In this embodiment, the detailed description of the configuration of the car 1 or the content of control in the car 1 will be omitted.

Each of the first to fourth imaging units 11 to 14 includes a lens unit and an imaging element. The lens units are attached to the imaging device 10 in a line in the horizontal direction such that the optical axes thereof are aligned in the same direction. The first to fourth imaging units 11 to 14 are configured so as to capture images in the same direction.

Figure 3:
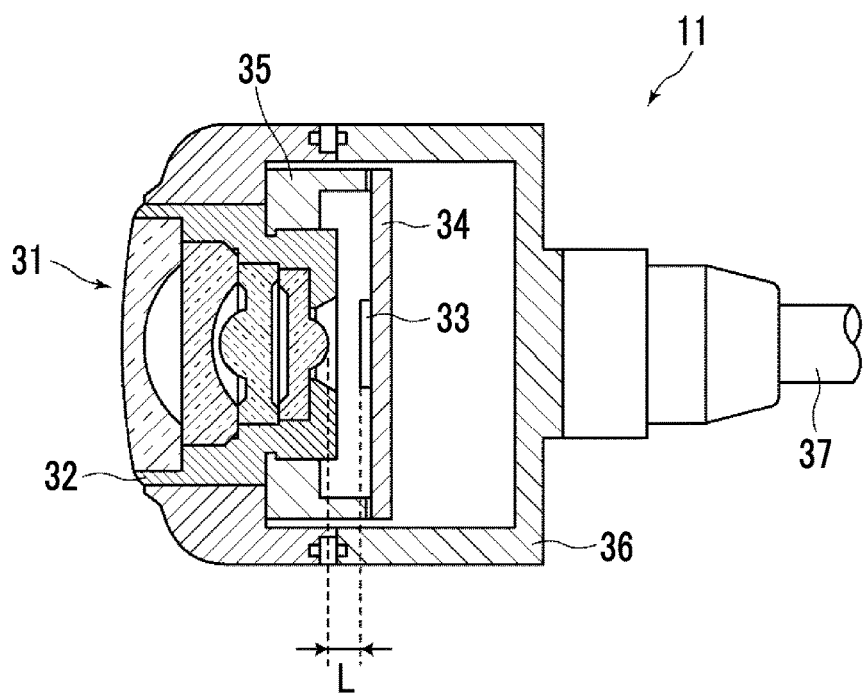
FIG. 3 is a diagram schematically illustrating the configuration of an imaging unit of the imaging device illustrated in FIG. 1.

FIG. 3 is a diagram schematically illustrating the configuration of the imaging unit. The first to fourth imaging units 11 to 14 have substantially the same configuration except only some components. Therefore, here, only the first imaging unit 11 will be described with reference to the drawings.

For example, the first imaging unit 11 is configured such that a lens unit that includes an optical system 31 including a plurality of lenses and a lens barrel 32 accommodating the optical system 31 and an imaging element 33 are accommodated in a housing 36 and light transmitted through the optical system 31 is incident on the imaging element 33. The optical system 31 consists of four lenses. In addition, an image signal acquired by the imaging element 33 is transmitted to the signal bus 20 through a wire 37.

The lens configuration of the optical system 31 is not limited to the lens configuration including the number of lenses and the shape of the lenses illustrated in FIG. 3, and the optical system 31 may have a lens configuration including three or less lenses or five or more lenses. In addition, the lenses may be made of various materials such as plastic, glass, and ceramic.

The imaging element 33 includes a plurality of photodiodes that are two-dimensionally arranged and may be, for example, a charge coupled device (CCD) image sensor or a complementary metal oxide semiconductor (CMOS) image sensor. Color filters of predetermined colors (for example, a total of four primary colors, that is, three primary colors of red (R), green (G), and blue (B) and near infrared (Ir)) are arranged in each photodiode in a predetermined array. The colors of the color filters are not limited to the above. For example, complementary color filters may be used or a method may be used which arranges color filters of four primary colors, that is, R, G, B, and R+G+B+Ir and subtracts R, G, and B from R+G+B+Ir in image data to calculate a data value of Ir. With this configuration, it is possible to obtain an image of an object in the range of visible light to near infrared.

The configuration in a case in which an image is captured in the range from visible light to near infrared has been described above. However, in a case in which an image is captured in the range of short-wavelength infrared to far infrared, lenses made of germanium, chalcogenide, and zinc sulfide may be appropriately used in addition to the above-mentioned lenses. In addition, an imaging element that is made of indium gallium arsenide, vanadium oxide, or silicon oxide is preferably used as the imaging element. The color filter may be appropriately used according to a necessary wavelength.

The imaging element 33 is fixed to a substrate 34 and the lens barrel 32 and the substrate 34 are held by a holder 35 in the housing 36. A distance L from the rearmost end of the lens in the optical system 31 to the imaging element 33 is determined by the thickness of the holder 35. The first to fourth imaging units 11 to 14 are different only in the thickness (dimensions in the optical axis direction of the optical system) of the holder 35.

Figure 4:
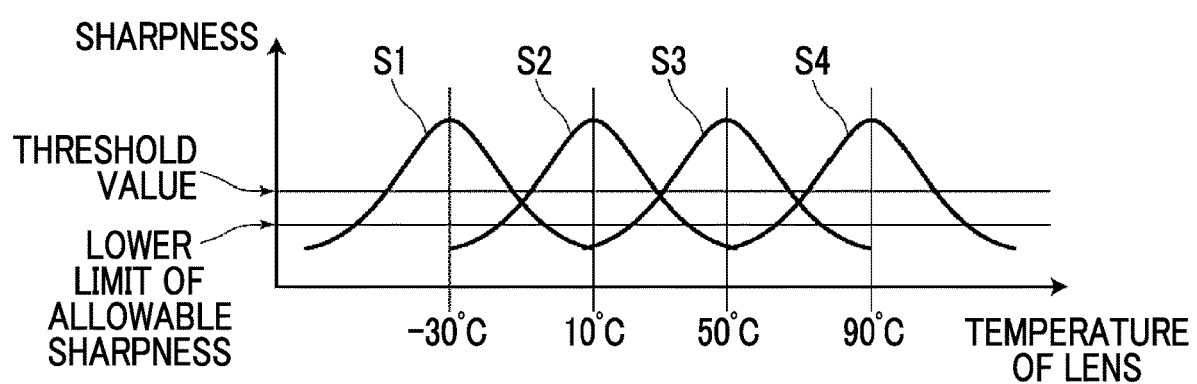
FIG. 4 is a graph illustrating the relationship between sharpness and the temperature of each imaging unit.

FIG. 4 is a graph illustrating the relationship between sharpness and the temperature of each imaging unit. In FIG. 4, the horizontal axis indicates the temperature of the lens, the vertical axis indicates sharpness, and S1 to S4 indicate the characteristics of the first to fourth imaging units 11 to 14, respectively. Table 1 shows the relationship between each imaging unit and the distance L from the rearmost end of the lens to the imaging element 33.

TABLE 1

| | Focus temperature | Available temperature range | Distance L from rearmost end of lens to imaging element |
|---|---|---|---|
| First imaging unit | −30° C. ± 5° C. | −60° C. to 0° C. | L = 0.85a (Back focal length of third imaging unit at −30° C.) |
| Second imaging unit | 10° C. ± 5° C. | −20° C. to 40° C. | L = 0.9a (Back focal length of third imaging unit at 10° C.) |
| Third imaging unit | 50° C. ± 5° C. | 20° C. to 80° C. | L = a |
| Fourth imaging unit | 90° C. ± 5° C. | 60° C. to 110° C. | L = 1.1a (Back focal length of third imaging unit at 90° C.) |

As illustrated in Table 1, the first to fourth imaging units 11 to 14 are different in the temperature (focus temperature) at which the sharpness is the maximum. Specifically, the focus temperature of the first imaging unit 11 is set to −30° C. (an error of ±5° C.) and the focus temperatures of the second to fourth imaging units 12 to 14 are set at an interval of 40° C. from the focus temperature of the first imaging unit 11. The available temperature range of each imaging unit is ±30° C. from the focus temperature.

The first to fourth imaging units 11 to 14 have the same lens unit and the distance L from the rearmost end of the lens in the optical system 31 to the imaging element 33 in each imaging unit varies depending on the thickness of the holder 35. The distance L is set on the basis of the third imaging unit 13 at an intermediate focus temperature so as to be the back focal length of the lens unit at the focus temperature of each imaging unit. This configuration makes it possible to achieve the imaging units which include lens units having the same lens configuration and have different focus temperatures. Therefore, it is possible to easily design the lenses and to reduce costs.

For example, Table 1 shows that, as the temperature becomes lower, the image formation position of the lens unit becomes closer to an object. In some cases, the image formation position becomes closer to an image as the temperature becomes lower, the image formation position is moved to the object up to a given low temperature, or the image formation position is moved to the image at a low temperature, depending on the material and/or the shape of the lens and/or the lens barrel and a method for connecting the lens and the lens barrel. In this case, the temperature at which the sharpness is the maximum may be appropriately determined and the thickness of the holder 35 may be adjusted such that the sharpness is the maximum at the temperature.

For the arrangement position of the first to fourth imaging units 11 to 14 in the optical axis direction, in a case in which the first to fourth imaging units 11 to 14 are arranged such that the leading ends of the lenses in the lens units of each imaging unit are in the same plane perpendicular to the optical axis, it is possible to prevent the images output from the imaging units at the same temperature from having the same sharpness. Therefore, this arrangement is preferable.

Conversely, for the arrangement position of the first to fourth imaging units 11 to 14 in the optical axis direction, in a case in which the first to fourth imaging units 11 to 14 are arranged such that the light incident surfaces of the imaging elements 33 in each imaging unit are in the same plane perpendicular to the optical axis, there is a concern that the images output from the imaging units at the same temperature under specific conditions, such as the focal length of the lens unit and/or a condition in which the object is very close, will have the same sharpness, which is not preferable.

Figure 5:
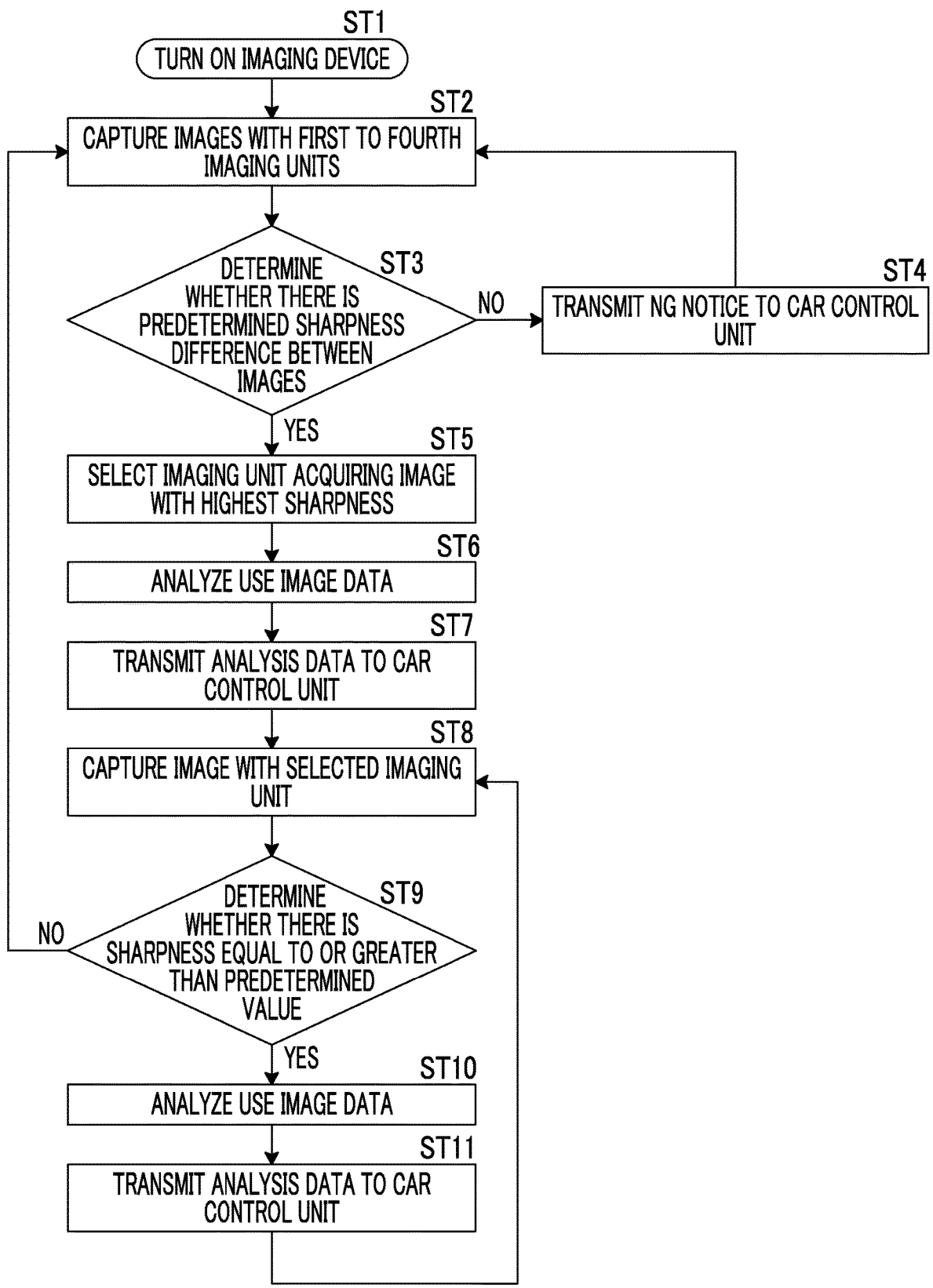
FIG. 5 is a flowchart during the operation of the imaging device illustrated in FIG. 1.

Next, a process during the operation of the imaging device 10 will be described. FIG. 5 is a flowchart illustrating a process during the operation of the imaging device. Here, the control unit 25 of the imaging device 10 controls the overall operation of the imaging section 21, the image processing unit 22, the selection unit 23, and the image analysis unit 24 to perform the process.

First, in a case in which the imaging device 10 is turned on (Step ST1), the first to fourth imaging units 11 to 14 capture images (Step ST2). Then, the sharpnesses of the images acquired by each imaging unit are calculated and it is determined whether there is a predetermined difference between the sharpnesses of the images (Step ST3).

Here, the calculation of the sharpness of the image by the image processing unit 22 will be described in detail. The sharpness of the image can be calculated by the same method as a known method that calculates the sharpness of the image using contrast auto focus (AF). It is possible to use the contrast AF method without any change in order to increase the validity of the calculated value of the sharpness. For example, the following various methods can be used: a method which performs gain correction and/or offset correction; a method which extracts only a space region proper to calculate the sharpness of an image and calculates the sharpness; a method which calculates the sharpness considering the continuity of a plurality of images, which have been continuously captured in terms of time, in a temporal direction; and a method which performs Fourier transform for one image with a plurality of spatial frequencies to calculate a plurality of partial sharpnesses, applies different coefficients to the plurality of partial sharpnesses, and performs weighted addition to calculate the sharpness.

In a case in which there is no predetermined sharpness difference in Step ST3, a no-good (NG) notice indicating that the image output from the imaging unit is not reliable is transmitted to the car control unit 3 (Step ST4) and the process is performed again from Step ST2 after a predetermined period of time elapses. In a case in which there is no difference between the sharpnesses of the images, it is considered that the imaging units are out of order, the acquired images are blacked out since a very small amount of light is incident on the imaging units, or the acquired images are washed out since a very large amount of light is incident on the imaging units. For example, a state in which the headlights of the car 1 are not turned on at night and/or in a dark place or a state in which snow or mud is stuck to the windshield of the imaging device 10 is considered as a situation in which the acquired images are blacked out. For example, a state in which sunlight and/or light from the headlights of an upcoming car is directly incident on the imaging unit is considered as a situation in which the acquired images are washed out. In any of the cases, the image acquired in this statue has low reliability. Therefore, the NG notice is transmitted to the car control unit 3 to prevent errors in the control operation of the car 1.

In a case in which there is a predetermined sharpness difference in Step ST3, an imaging unit that has captured the image with the highest sharpness is selected as an imaging unit which captures a use image from the first to fourth imaging units 11 to 14 (Step ST5) and use image data is analyzed to recognize the lanes included in the use image or to recognize, for example, a vehicle, a pedestrian, and/or an obstacle (Step ST6). The analysis data is transmitted to the car control unit 3 (Step ST7). Then, the car 1 can perform vehicle movement control on the basis of the analysis data.

It is preferable to stop the supply of power to the imaging units other than the imaging unit selected in Step ST5 or to reduce the driving frequencies of the imaging units other than the selected imaging unit. This aspect makes it possible to reduce power consumption or to increase the life span of components.

Then, the imaging unit selected in Step ST5 captures images (Step ST8). The sharpness of the use image acquired by the selected imaging unit is calculated and it is determined whether the sharpness is equal to or greater than a threshold value that has been set to be greater than the lower limit of the allowable sharpness (Step ST9). In a case in which the sharpness is determined to be less than the threshold value in Step ST9, there is a possibility that the temperature of the surrounding environment of the car 1 provided with the imaging device 10 will change and the imaging unit that can acquire the image with the highest sharpness among the first to fourth imaging units 11 to 14 will change. Therefore, the process returns to Step ST2 and the imaging unit is reselected.

As described above, the focus temperatures of the first to fourth imaging units 11 to 14 are set at an interval of 40° C. It is quite unlikely that the temperature of the surrounding environment of the car 1 will be changed by 40° C. or more in a short time. Therefore, in a case in which the imaging unit is reselected, only the sharpnesses of the images acquired by the imaging unit that is acquiring the use image and the imaging units with the focus temperatures adjacent to the focus temperature of the imaging unit that is acquiring the use image are calculated and an imaging unit that acquires the image with the highest sharpness among the imaging units is selected as the imaging unit that acquires the use image. With this configuration, it is possible to prevent an increase in calculation costs in a case in which the imaging unit is reselected.

As illustrated in FIG. 4, the threshold value used for the determination of the sharpness in Step ST9 is set to be slightly greater than the sharpness at which the sharpness of the selected imaging unit is equal to the sharpness of the imaging units with the focus temperatures adjacent to the focus temperature of the selected imaging unit. Therefore, the imaging unit reselection process is performed immediately before the imaging unit that acquires the image with the highest sharpness changes with a change in temperature. As a result, it is possible to select the imaging unit that acquires the image with the highest sharpness without any delay even in a case in which the temperature changes.

In a case in which the sharpness is determined to be equal to or greater than the threshold value in Step ST9, use image data is analyzed to recognize the lanes included in the use image or to recognize, for example, a vehicle, a pedestrian, and/or an obstacle (Step ST10). The analysis data is transmitted to the car control unit 3 (Step ST11). Then, the process returns to Step ST8 and the subsequent imaging operation is continuously performed.

With this configuration, it is possible to achieve the imaging device 10 that can acquire an image with high sharpness in a wide temperature range, without providing a mechanical focus adjustment mechanism, and stably acquire a high-quality image in a wide temperature range over a long period of time. In addition, in a case in which imaging is performed in a wide wavelength range from visible light to near-infrared light as in this embodiment, it is necessary to solve two tasks, that is, the task of preventing a variation in aberration depending on the temperature and the task of preventing chromatic aberration in a wide wavelength range. The imaging device 10 according to this embodiment is particularly effective in this case.

As described above, since the individual imaging element is combined with each lens unit, a plurality of imaging units can capture images in parallel at the same time. Therefore, it is possible to reduce processing time in a case in which the imaging unit is selected.

Figure 6:
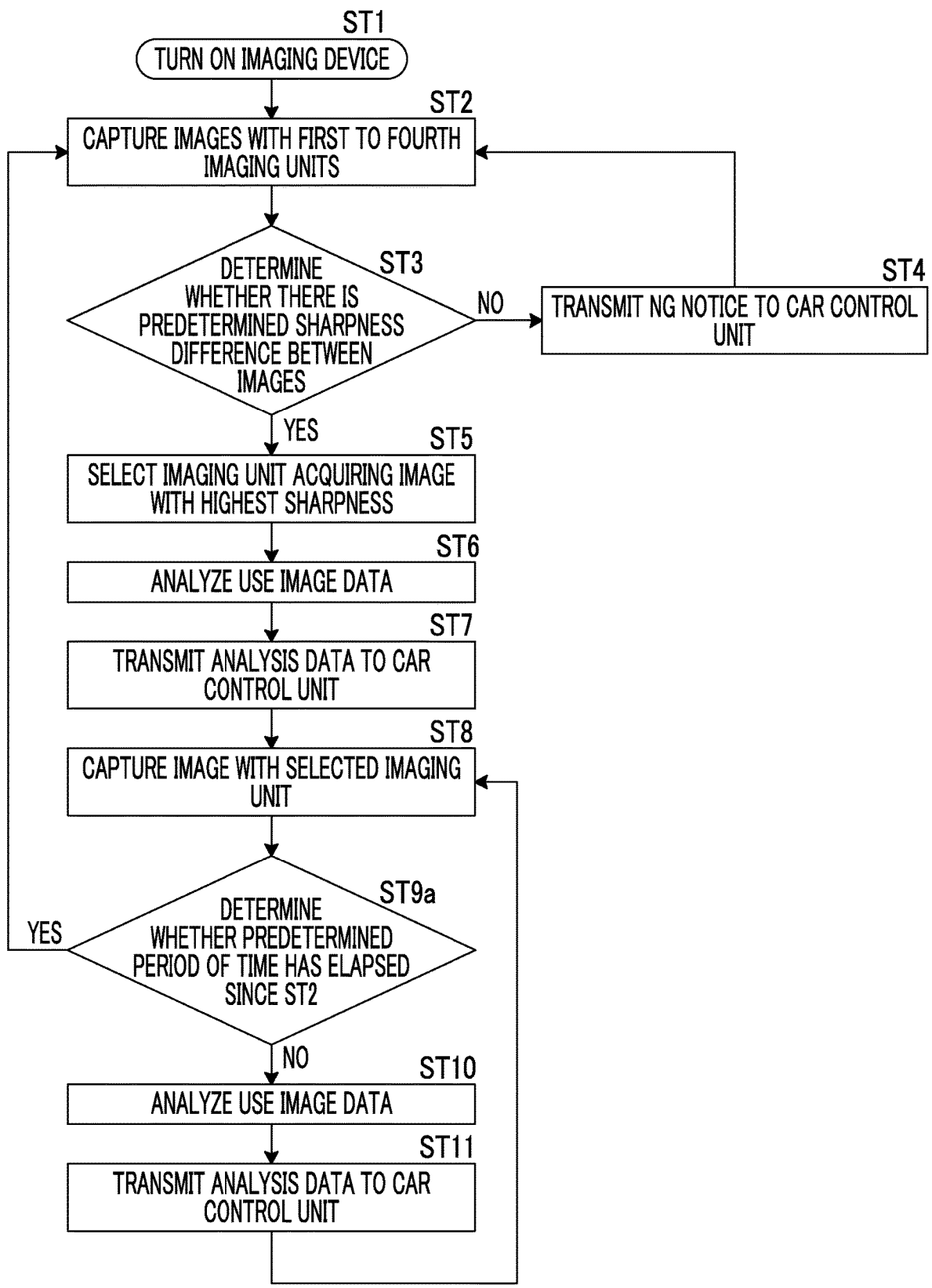
FIG. 6 is a flowchart illustrating another aspect during the operation of the imaging device illustrated in FIG. 1.

The process during the operation of the imaging device 10 according to this embodiment is not limited to the operation in the flowchart illustrated in FIG. 5 and may be an operation in a flowchart illustrated in FIG. 6. The flowchart illustrated in FIG. 6 is different from the flowchart illustrated in FIG. 5 only in Step ST9. Specifically, instead of determining whether the sharpness is equal to or greater than a predetermined value, it is determined whether a predetermined period of time has elapsed since Step ST2. In a case in which the predetermined period of time has elapsed, the process returns to Step ST2 and the imaging unit is selected again. In a case in which the predetermined period of time has not elapsed, for example, the subsequent imaging process is continuously performed. In this aspect, it is possible to obtain the same effect as described above.

In each of the operations in the flowcharts illustrated in FIGS. 5 and 6, in a case in which the process proceeds from Step ST5 to Step ST8, that is, the process proceeds to a next image capture process, Step ST5, Step ST6, Step ST7, and Step ST8 are performed in this order. However, the invention is not limited to this aspect. The process in Step ST6 and Step ST7 may be excluded from the flow of the process in the flowcharts illustrated in FIGS. 5 and 6 and may be performed in parallel at the same time as the next image capture process. This holds for the process in Step ST10 and Step ST11 in a loop after Step ST8.

Figure 7:
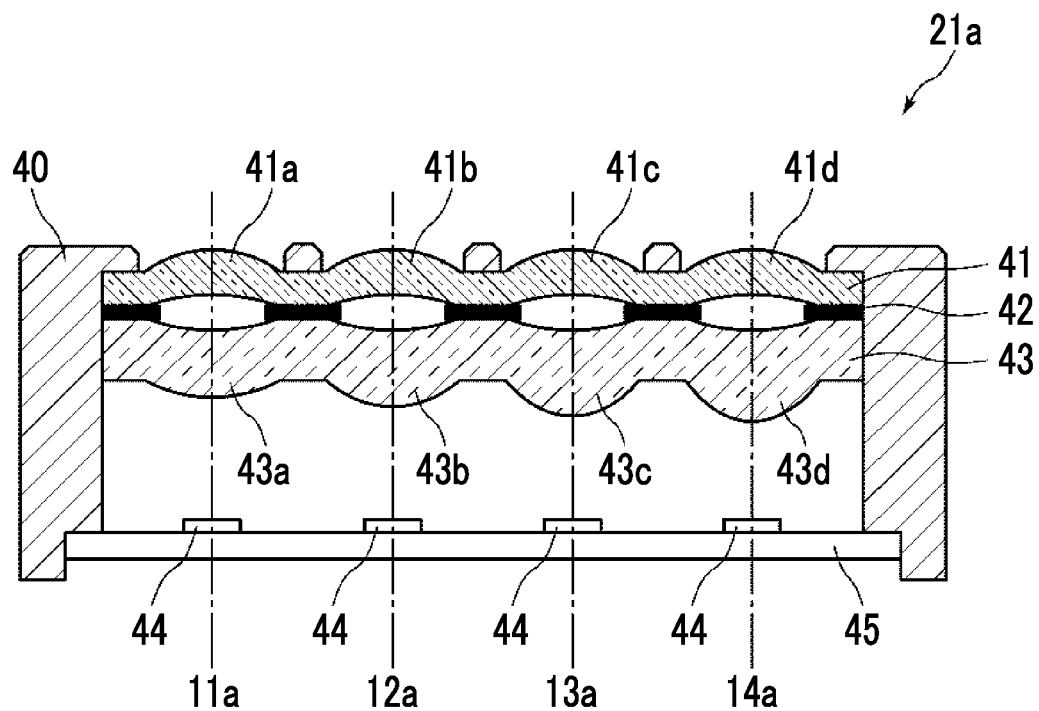
FIG. 7 is a diagram schematically illustrating the configuration of an imaging section of an imaging device according to a second embodiment of the invention.

Next, a second embodiment of the invention will be described in detail with reference to the drawings. FIG. 7 is a diagram schematically illustrating the configuration of an imaging section of an imaging device according to the second embodiment of the invention.

The imaging device according to the second embodiment is different from the imaging device according to the first embodiment only in the configuration of the imaging section. Here, the description of the same components as those of the imaging device according to the first embodiment will not be repeated.

As illustrated in FIG. 7, in an imaging section 21a according to this embodiment, a plurality of lens units with different focus temperatures and imaging elements 44 for each lens unit are accommodated in one housing 40.

Lenses in each lens unit are integrated into a lens array. In the lens units, a first lens array 41 in which lenses 41a to 41d for forming the lens units for first to fourth imaging units 11a to 14a, respectively, are integrally formed, a light shielding sheet 42 functioning as a stop, and a second lens array 43 in which lenses 43a to 43d for forming the lens units for the first to fourth imaging units 11a to 14a, respectively, are integrally formed are stacked in this order from the object side.

The imaging elements 44 for the first to fourth imaging units 11a to 14a are fixed to the same substrate 45. In this embodiment, it is difficult to individually change the distances between the lens units and the imaging elements unlike the imaging section according to the first embodiment. However, the curvature of the lenses forming each lens unit, the distance between the lenses, and/or a lens material is appropriately selected to change the configuration of each lens unit such that each lens unit has the highest sharpness at a desired temperature. In this way, the first to fourth imaging units 11a to 14a with different focus temperatures are obtained.

As described above, since the lens units have different lens configurations, it is possible to design the lenses most suitable for each imaging unit. Therefore, it is easier to improve the optical performance of the lens unit than that in a case in which the lens units have the same lens configuration.

With this configuration, it is possible to obtain the same effect as that in the first embodiment.

Figure 8:
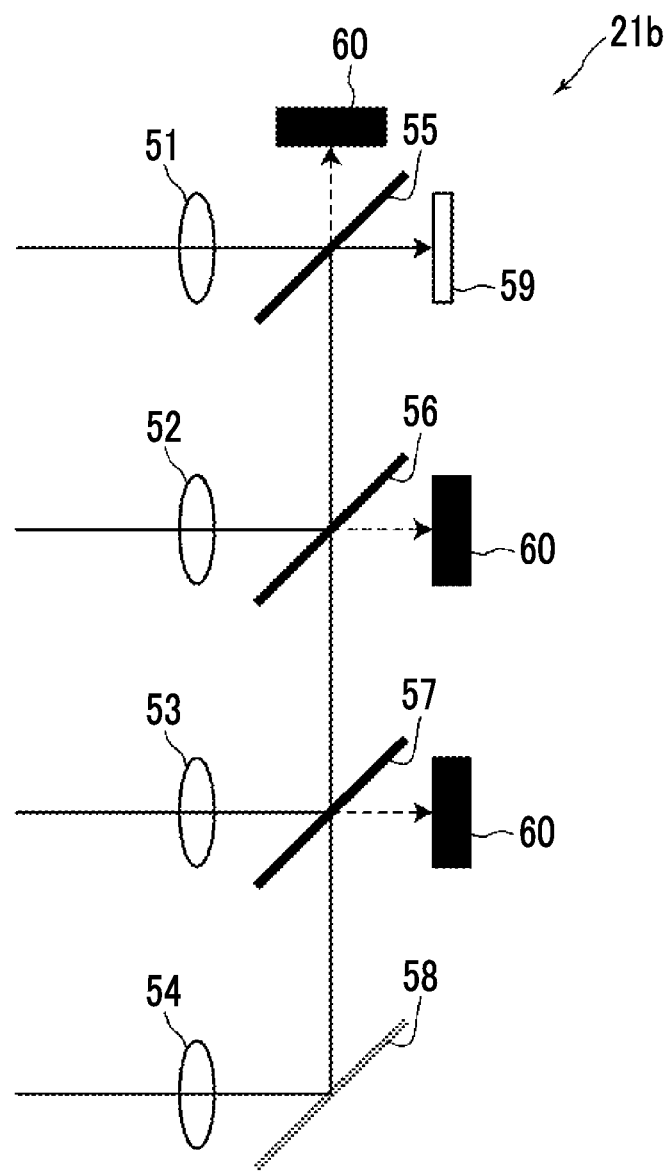
FIG. 8 is a diagram schematically illustrating the configuration of an imaging section of an imaging device according to a third embodiment of the invention.

Next, a third embodiment of the invention will be described in detail with reference to the drawings. FIG. 8 is a diagram schematically illustrating the configuration of an imaging section of an imaging device according to the third embodiment of the invention.

The imaging device according to the third embodiment is different from the imaging device according to the first embodiment only in the configuration of the imaging section. Here, the description of the same components as those of the imaging device according to the first embodiment will not be repeated.

As illustrated in FIG. 8, an imaging section 21b according to this embodiment includes first to fourth lens units 51 to 54 corresponding to the first to fourth imaging units, light control elements 55 to 57 that can selectively switch between the transmission of light and the reflection of light, a mirror 58, an imaging element 59, and a light shielding member 60 that absorbs light.

The lens units are arranged such that the optical axes are aligned in the same direction. FIG. 8 schematically illustrates each lens unit and does not illustrate the actual lens configuration. Each lens unit may have any configuration. In addition, for example, an element disclosed in JP2014-26262A can be used as the light control element that can selectively switch between the transmission of light and the reflection of light.

The first to fourth lens units 51 to 54 have the same configuration and the length of an optical path from the rearmost end of the lens in each lens unit to the imaging element 59 is changed to form the first to fourth imaging units with different focus temperatures.

Specifically, in a case in which the first imaging unit acquires an image, all of the light control elements 55 to 57 are changed to a transmission state such that light focused by the first lens unit 51 is incident on the imaging element 59. In a case in which the second imaging unit acquires an image, all of the light control elements 55 to 57 are changed to a reflection state such that light focused by the second lens unit 52 is incident on the imaging element 59. In a case in which the third imaging unit acquires an image, the light control elements 55 and 57 are changed to the reflection state and the light control element 56 is changed to the transmission state such that light focused by the third lens unit 53 is incident on the imaging element 59. In a case in which the fourth imaging unit acquires an image, the light control element 55 is changed to the reflection state and the light control elements 56 and 57 are changed to the transmission state such that light focused by the fourth lens unit 54 is incident on the imaging element 59.

As described above, a plurality of lens units share one imaging element. Therefore, it is possible to reduce the number of times an expensive imaging element is used and thus to prevent an increase in the costs of the imaging section.

With this configuration, it is possible to obtain the same effect as that in the first embodiment.

Figure 9:
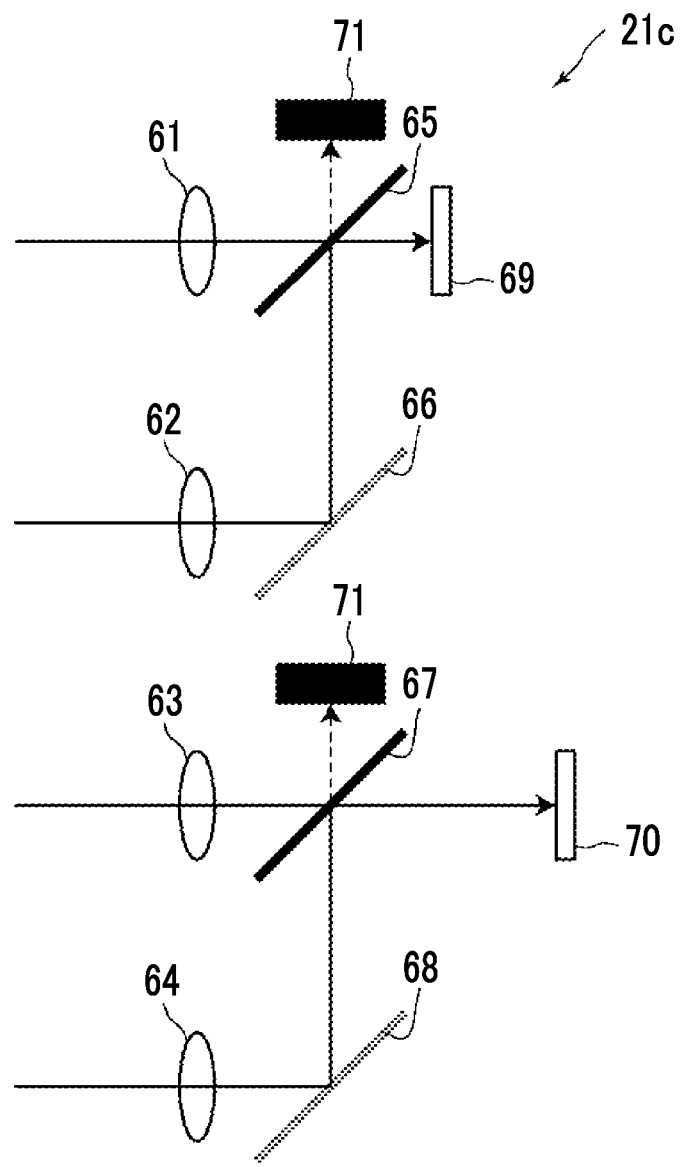
FIG. 9 is a diagram schematically illustrating the configuration of another aspect of the imaging section of the imaging device according to the third embodiment of the invention.

The aspect in which the light control elements are used to switch the optical path is not limited to the aspect illustrated in FIG. 8 and an aspect illustrated in FIG. 9 may be used.

As illustrated in FIG. 9, an imaging section 21c according to another aspect of this embodiment includes first to fourth lens units 61 to 64 corresponding to the first to fourth imaging units, light control elements 65 and 67 that can selectively switch between the transmission of light and the reflection of light, mirrors 66 and 68, imaging elements 69 and 70, and a light shielding member 71 that absorbs light.

The first lens unit 61 and the third lens unit 63 have the same configuration and the second lens unit 62 and the fourth lens unit 64 have the same configuration. The first lens unit 61 and the second lens unit 62 share the imaging element 69 and the third lens unit 63 and the fourth lens unit 64 share the imaging element 70. In addition, a distance from the light control element 65 to the imaging element 69 is different from a distance from the light control element 67 to the imaging element 70.

The transmission state and the reflection state of the light control element 65 and the light control element 67 are switched to change the length of an optical path from the rearmost end of the lens in each lens unit to the imaging element 69 or the imaging element 70. In this way, it is possible to form the first to fourth imaging units with different focus temperatures.

With this configuration, it is possible to obtain the same effect as that in the first embodiment.

As the aspect in which the light control elements are used to switch the optical path, an aspect different from those illustrated in FIGS. 8 and 9 may be used.

The embodiments and the examples of the invention have been described above.

However, the invention is not limited to the above-described embodiments and examples and various modifications can be made.

For example, the number of imaging units is not limited to four and two or more imaging units may be provided.

In the above-described embodiments, a plurality of imaging units are arranged in a line in the horizontal direction. However, the invention is not limited thereto and the imaging units may be arranged in a line in the vertical direction or a plurality of rows and/or columns of imaging units may be two dimensionally arranged in the horizontal direction and/or the vertical direction.

For the arrangement order of a plurality of imaging units with different focus temperatures, the aspect in which the imaging units are arranged in the order of the focus temperature has been described. However, the invention is not limited thereto. An imaging unit suitable for a high temperature may be provided at the edge or the periphery where it is easy to cool the imaging unit and an imaging unit suitable for a low temperature may be provided at the center where it is easy to keep the imaging unit warm.

The arrangement position of the imaging units is not limited to the inside of the windshield of the car and the imaging unit may be provided in other places such as a front bumper and/or a front grill.

In a case in which the imaging section includes a plurality of imaging elements and the brightness value of an image output from the selected imaging unit is low, weighted addition may be performed for the images output from the other imaging units to acquire the use image. This aspect makes it possible to obtain an image with high brightness even in a case in which a small amount of light is incident on the imaging unit, for example, at night. Image data obtained from a distant place that is in front of the imaging unit has a relatively high sharpness. However, in general, light from the headlights does not reach the distant place and the distant place is dark. Therefore, the images output from a plurality of imaging units is not simply added and only the image data particularly obtained from a distant place may be extracted and added.

The aspect in which the imaging device is provided in the car has been described. However, the invention is not limited thereto and can be applied to various aspects. For example, the imaging device may be provided in other types of moving bodies, such as airplanes or artificial satellites, or may be used as an outdoor surveillance camera.

Of course, various modifications and changes of the invention can be made without departing from the scope and spirit of the invention.

EXPLANATION OF REFERENCES

1: car
2: signal bus
3: car control unit
10: imaging device
11 to 14: imaging unit
11a to 14a: imaging unit
20: signal bus
21, 21a, 21b, 21c: imaging section
22: image processing unit
23: selection unit
24: image analysis unit
25: control unit
31: optical system
32: lens barrel
33: imaging element
34: substrate
35: holder
36: housing
37: wire
40: housing
41: lens array
41a to 41d: lens
42: light shielding sheet
43: lens array
43a to 43d: lens
44: imaging element
45: substrate
51 to 54: lens unit
55 to 57: light control element
58: mirror
59: imaging element
60: light shielding member
61 to 64: lens unit
65, 67: light control element
66, 68: mirror
69, 70: imaging element
71: light shielding member
S1 to S4: characteristics of each imaging unit
ST1 to ST11: step

What is claimed is:
1. An imaging device comprising:
an imaging section that includes a plurality of lens units having optical axes aligned in the same direction and one or more imaging elements, the lens units and the imaging elements being combined to form imaging units, the imaging units having their respective focus temperatures that are different from each other, a focus position with respect to a subject of each imaging unit being identical at the focus temperature of each imaging unit;

an image processor configured to calculate a sharpness of an image acquired by each imaging unit;

a selection processor configured to select an imaging unit which acquires a use image on the basis of the sharpness; and a control processor configured to control the imaging section, the image processor, and the selection processor, wherein the control processor directs the image processor to calculate the sharpness of the image acquired by the imaging unit which is acquiring the use image, and in a case in which the sharpness of the use image is less than a set threshold value, the control processor directs the imaging section to capture images using the plurality of imaging units, directs the image processor to calculate the sharpness of the image acquired by each imaging unit, and directs the selection processor to reselect the imaging unit which acquires the use image.

2. The imaging device according to claim 1, wherein, in a case in which the imaging unit which acquires the use image is reselected, the control processor directs the imaging sections to capture images using the imaging unit which is acquiring the use image, an imaging unit with a focus temperature that is closest to the focus temperature of the imaging unit which is acquiring the use image in a range that is higher than the focus temperature of the imaging unit which is acquiring the use image, and an imaging unit with a focus temperature that is closest to the focus temperature of the imaging unit which is acquiring the use image in a range that is lower than the focus temperature of the imaging unit which is acquiring the use image and directs the image processor to calculate the sharpnesses of only the images acquired by the imaging unit which is acquiring the use image, the imaging unit with the focus temperature that is closest to the focus temperature of the imaging unit which is acquiring the use image in the range that is higher than the focus temperature of the imaging unit which is acquiring the use image, and the imaging unit with the focus temperature that is closest to the focus temperature of the imaging unit which is acquiring the use image in the range that is lower than the focus temperature of the imaging unit which is acquiring the use image.

3. The imaging device according to claim 1, wherein the control processor directs the imaging section to capture images using the plurality of imaging units, directs the image processor to calculate the sharpness of the image acquired by each imaging unit, and directs the selection processor to reselect the imaging unit which acquires the use image at a set time interval.

4. The imaging device according to claim 1, wherein the selection processor selects an imaging unit which has acquired the image with the highest sharpness as the imaging unit which acquires the use image.

5. The imaging device according to claim 1, wherein the imaging section is configured such that distances from rearmost ends of lenses in the lens units to the imaging elements on the optical axis are different from each other.

6. The imaging device according to claim 1, wherein two or more of the plurality of lens units have the same lens configuration.

7. The imaging device according to claim 1, wherein two or more of the plurality of lens units have different lens configurations.

8. The imaging device according to claim 1, wherein leading ends of the lenses in the plurality of lens units are in the same plane perpendicular to the optical axis.

9. The imaging device according to claim 1, wherein the imaging section is configured such that an individual imaging element is combined with each lens unit.

10. The imaging device according to claim 1, wherein the imaging section is configured such that the plurality of lens units share one imaging element.

* * * * *